United States Patent [19]

Stolzer et al.

[11] Patent Number: 4,708,566

[45] Date of Patent: Nov. 24, 1987

[54] STACK CONVEYOR AND HANDLER IN THE FORM OF A CRANE

[75] Inventors: Paul Stolzer, Achern; Dieter Spath, Oberachern, both of Fed. Rep. of Germany

[73] Assignee: Keuro Maschinenbau Gesellschaft Mit Beschrankter, Haftung & Co. Kommanditgesellschaft, Achern-Gamshurst, Fed. Rep. of Germany

[21] Appl. No.: 859,947

[22] Filed: May 5, 1986

[30] Foreign Application Priority Data

May 11, 1985 [DE] Fed. Rep. of Germany ....... 3517061

[51] Int. Cl.4 .............................................. B65G 65/02
[52] U.S. Cl. ................................... 414/276; 294/81.6; 414/282; 414/283; 414/622; 414/745; 414/911
[58] Field of Search ............... 414/276, 277, 280, 281, 414/282, 283, 745, 910, 911, 620, 621, 622, 626; 294/81.6, 81.61

[56] References Cited

U.S. PATENT DOCUMENTS

3,197,251 7/1965 Travis, Jr. .................... 294/81.61 X
3,850,317 11/1974 Lumier ............................ 414/281 X
4,372,724 2/1983 Stolzer ............................ 414/276 X
4,375,936 3/1983 Dechantsreiter ............... 414/910 X Primary Examiner—Robert J. Spar
Assistant Examiner—Stuart J. Millman
Attorney, Agent, or Firm—Edwin E. Greigg

[57] ABSTRACT

A stack conveyor and handler in the form of a crane for stacking rod-like material in a warehouse or storage system or the like, in which the load-bearing beam is vertically movable on guides of the crane and has load pickup devices in the form of prongs or the like. Prongs identical to these prongs and located opposite them are firmly connected to the beam, and clamping mandrels for gripping the material are movable substantially vertically between opposed prongs. The load-bearing beam is supported such that it is rotatable, about an axis that is horizontal as well as parallel to the corridors between stacks, between at least two operating positions, in which the prongs extend in the longitudinal direction.

20 Claims, 7 Drawing Figures

STACK CONVEYOR AND HANDLER IN THE FORM OF A CRANE

BACKGROUND OF THE INVENTION

The invention relates to a stack conveyor and material handler in the form of a crane, in particular for use in a warehouse with a storage system or the like, for storing rod- or bar-like material.

The apparatus has multiple stack frames disposed in parallel forming arrays but crosswise to the longitudinal extent of the conveyor unit with terminal portions aranged flush with one another in the storeroom longitudinal direction. Arranged in a shelf-like manner, these stack frames are provided with adjacent rows of supporting arms for receiving the rod material; these arms are arranged on the vertical stack frames in row like arrays one ahove the other extending in a longitudinal direction. Above the tiers of shelves, a crane is disposed to be movable crosswise to corridors provided between adjacent stack frames. The crane has vertical guides for a horizontal load-bearing beam, disposed parallel to the corridors between stack frames and can be raised and lowered in between the tiers of shelves as well as over and under the stack frames. On one side, protruding horizontally between the rows of supporting arms, a load-bearing beam is disposed with a firmly attached load pickup means comprising prongs or the like extending in a longitudinal direction. By movement of the crane, the prongs can be brought into alignment with the shelves and inserted therein to store or remove material from storage.

In a stack conveyor and material handler of this kind, the crane may comprise a portal crane that moves over the stack, arrays or a bridge crane movable above them wherein the load-bearing beam is let down into the corridors between stacks from the crane above. Conveyors that are movable from underneath the stack arrays are also known, which then raise the load-bearing beams into the corridors between stacks. The invention relates without limitation to all such types, and similar types, of crane construction known in the art.

A crane conveyor and material handler of the type described above is known from U.S. Pat. No. 4,372,724, for example. Together with the particular storage system for rod-like material involved, it serves to provide partitioning machines with material and to return usable leftover material to storage for further use. However, because of the positive connection of the prongs with the load-bearing beam, which is provided for reasons of stability, the only stacks that can be used are those having supporting arms or shelves disposed upon only one side. If the load-bearing beam were provided with corresponding prongs on both sides in the horizontal direction, to enable using stacks provided with shelves on both sides, then the width of the stack corridors would have to be practically douhled, to permit the vertical movement of the load-bearing beam. However, that would mean that to handle the material located on one side, the width of the corridor associated with the other side would be virtually useless and superfluous. Moreover, because the stacks of shelves are provided on only one side, virtually twice as many vertical stack supports are needed, which also means a corresponding additional requirement for stack components and storage space.

In the known case, the prongs have upwardly protruding bosses or mandrels on their free front ends; this provision, together with a slightly oblique position of the prongs, assures that rod-like material, which includes narrow cassettes containing a number of thin rods, carried by the prongs cannot slide off or roll from the prongs as the crane moves. In this manner, a relatively high speed of crane movement is possible; however, this speed is provided at the cost of the additional horizontal space required for the bosses or mandrels and the additional corridor width that then becomes necessary. Furthermore, at least rectangular material must be stored in the tiers of shelves with some distance from one piece to the next, so that there is a space between the rods of material for the bosses or mandrels to engage. Once again, this means additional space is required, or else stack shelves that are wider in the horizontal direction than is actually necessary must be provided, to hold a certain amount of material. As for the spacing between the rods of material in the tiers of shelves, there is also the danger that the rods may not be stored exactly parallel to one another, and so the spacing must then be increased still further to provide a margin of safety.

OBJECTS AND SUMMARY OF THE INVENTION

In view of the above problems, it is the principal object of the invention to provide an improved stack conveyor and material handler of the above general type such that without increasing the width of the corridor between stacks, the conveyor and handler can reach stacks that have shelves on both sides.

It is another object to provide an apparatus in which the width of the corridors between stacks could in fact even be reduced, yet at the same time making it possible to increase the conveying speed of the crane still further, while assuring a certain freedom in terms of rod-like material that may not be located exactly parallel to one another.

It is a further object to provide an invention in which these purposes are attained using simple means, that are reliable in operation, for the sake of better utilization of available storage space and to shorten the time required for fetching material.

It is still another object of the invention to provide that opposite each of the prongs and spaced apart therefrom in the vertical direction by substantially the maximum cross section of the material to be stored is a respective identical prong connected in reverse fashion to the load-bearing beam. In the region between opposing prongs, clamping mandrels or the like extending in the longitudinal direction are movable suhstantially vertically and are fastenable against the prongs for clamping the material, the length of the mandrels being substantially equal to that of the prongs; and finally, the load-bearing beam in the end position is supported for movement on the vertical guides in such a way that it is rotatable about a horizontal axis, which runs parallel to the corridors between stacks, to assume at least two operating positions, in both of which the prongs are pointed longitudinally of the storage system.

It is yet another object of the invention to make it possible to dispense with upwardly protruding bosses or mandrels on the free ends of the prongs, because the material is now firmly fastened between the prongs and the clamping mandrels while it is being conveyed. Thus the wasted space for the previously required bosses is no longer needed, and at the same time the conveying speed can be increased, because the security with which the material rests on the prongs is no longer dependent solely on the weight of the borne material, but instead can be controlled by means of the magnitude of the force with which the clamping mandrels press the material against the prongs. Because the bosses previously use are eliminated, however, it is now also possible to store the material in the tiers of shelves such that it is in contact with one another, that is, without spaces in between, because the provisions of the invention assure that the material can be grasped as if with tongs or pliers. Thus the wasted space between items in storage is no longer needed, and the overall amount of space needed is reduced. It also becomes unimportant whether bar-like material is stored exactly parallel or not, because given the ability to direct material pickup by the prongs there is a very wide range of freedom.

It is still a further object of the invention to provide that the load-bearing beam can rotate about a longitudinal axis and can be equipped as described with pairs of prongs, so that the stacks can now have shelves on both sides, because the load-bearing beam can operate on both sides of a stack corridor about an angle of approximately 180° depending upon its rotational position without having to widen the corridors between adjacent tiers of stacks. The clamping mandrels can be used in the same manner for both operating positions of the load-bearing beam, merely pressing the material against either one or the other row of prongs at a given time. Although the number of prongs involved is doubled, so as to continue to assure a secure and thus stable connection between the prongs and the load-bearing beam, there is neither the need to use the pivotable prongs known in the prior art (which would not even be capable of bearing such large loads) nor the need to double the number of clamping means, that is the clamping mandrels, because they can be used for both operating positions of the load-bearing beam.

It is still another object of the invention to provide that turning the load-hearing beam from one operating position to the other can be done outside the tiers of stacks, for instance above the shelves during the movement from one working corridor to the next, if it is desired to keep the corridor width to a minimum which would not allow for turning the load-bearing beam inside the corridor. On the other hand, the system can also be managed in such a way that successive handling of material that is positioned in one and the same corridor between adjacent tiers of stacks is not required.

It is still an additional object of the invention for the clamping mandrels to be disposed on the free end of swivel arms rotatably supported on the load-bearing beam, and for the swivel arms to be movable automatically by electric, hydraulic or pneumatic positioning means carried by the load-bearing beam. This embodiment assures that the clamping mandrels, together with their positioning means, remain within the space occupied by the pair of prongs, so that there are no projecting parts that would require additional space.

It is yet an additional object of the invention for the swivel bearing of the swivel arms to be located between adjacent pairs of prongs. The swivel arms may also each be rotatably supported via a shaft, on the load-bearing beam extending in the longitudinal direction. On the side of the load-bearing beam opposite the swivel arms the shafts may carry positioning arms, which are engaged by the positioning means; it is useful for the swivel arms to be movable hy a shared positioning means. As a result, synchronized movement of all the clamping mandrels is attained in a simple manner.

In yet another object of the invention the swivel arms or positioning arms may also be joined together by a rod that is parallel to the load-bearing beam; in that case the rod is articulated on the positioning means. It is then advantageous for positioning means acting in the same direction to be articulated on both ends of the rod, so as to assure even load distribution over the length of the rod.

It is yet still another object of the invention that the positioning arms are rotationally joined to the swivel arms via spring means, so as to assure unforced clamping of the material, regardless of the cross section of the material. If the positioning arms are rotationally joined to the swivel arms via a torsion spring bar disposed in a bore of the shaft, then in a particularly space-saving manner it is assured that - assuming that the positioning means move by an equal amount - when material of large cross section is gripped, the pre-stressing of the spring will be high, while when material of small cross section is gripped the pre-stressing will be correspondingly less, so that the tension exerted is adapted to the weight of the material that is to be moved.

It is yet an added object of the invention to provide means in terms of the spacing between opposed prongs, which is dictated by the maximum cross section of the material that is expected to be handled, for the clamping mandrels, in the two extreme positions of their range of motion, to be lowered completely into recesses in the prongs, to assure that the clamping mandrels do not restrict the associated free cross section located between the prongs.

In accordance with yet another object of the invention swiveling of the load-bearing beam is advantageously effected by electric, hydraulic or pneumatic means disposed on the crane, and the load-bearing beam may optionally be retainable in its operating positions by these means. Various known possibilities exist for positioning the load-bearing beam, such as adjustable stops, indexing pins and so forth. However, it is advantageous for this object of positioning to be effected by the means for rotating the load-bearing beam, and to this end a servomotor can be provided on the means for moving the beam on the vertical guides; the servomotor may have a drive connection with the beam and may comprise a rotational transducer for rotating the beam.

In yet a further object of the invention it is also useful for the prongs to have extensions that are automatically extendable and retractable via guides extending in the longitudinal direction of the prongs. This makes it possible to use the prongs to pick up pallets stored at particular locations as well, when the pallets are wider than the free length of the previously known type of prongs. In this way, the stack conveyor and material handler according to the invention becomes universally usable. In this connection, if care is taken to provide that the clamping mandrels have a cross-sectional reduction beside the swivel arms, then the clamping mandrels can grasp the upper edge of the pallets with this cross-sectional reduction, and in this way the pallets are secured against slipping during crane movements by their positive fit against the mandrels.

In yet another object of the invention, the supporting arms of the shelves may be positioned slightly obliquely, extending somewhat upward from the stack supports out to their free ends. If the supporting arms are arranged in this way, then it is useful for the prongs as well to be positioned parallel to the supporting arms, in both operating positions of the load-bearing beam.

In a further development and object of the invention, it is useful also to provided a way for conveying and handling relatively large cassettes for receiving rod-like material, which are positioned at separate locations in the storeroom or storage system. To this end, it is useful for the load-bearing beam to be rotatable into and positionable in a third operating position, in which the prongs extend vertically downward, and for further load pickup means, in the form of telescoping forks that are extendable and retractable on both sides in the longitudinal direction, to be disposed between the rows of supporting arms, on the side of the load-bearing beam remote from the prongs.

Telescoping forks that are extendable on both sides are known in the prior art, but arranging them on the "back" of the load-bearing beam, while not requiring a particularly great amount of space, affords the additional opportunity of grasping and moving cassettes for holding long items, so that the storage system can be more universally used without having to provide a specialized or separate stack conveyor and material handler for the cassettes themselves.

In an added and further object seeking to control the crane movement, it is useful for a light barrier to be provided, in a manner known in the prior art between the free ends of the pairs of associated prongs; by this means, the presence of rod-like material can be detected and the horizontal movement of the crane for fetching or storing the material can be controlled.

The invention will be better understood and further objects and advantages thereof will hecome more apparent from the ensuing detailed description of a preferred embodiment taken in conjunction with the drawings.

BRIEF DESCRIPTION OF THE DRAWINGS

FIG. 6 shows a modified embodiment of the invention shown as.in FIG. 3; and

DESCRIPTION OF THE PREFERRED EMBODIMENT

Figure 1:
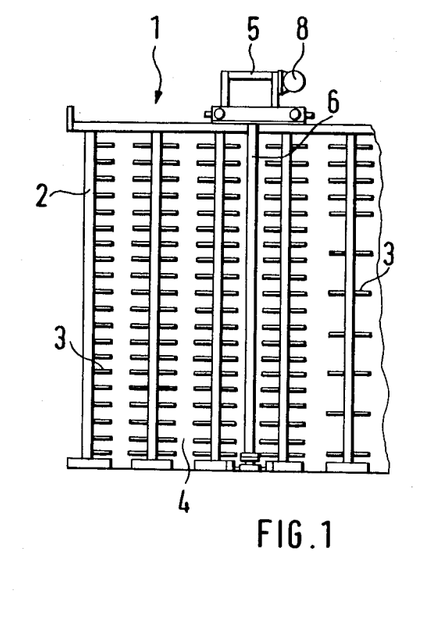
FIG. 1 is a side elevational view of a detail of a stack arrangement having shelves and a crane.
Figure 2:
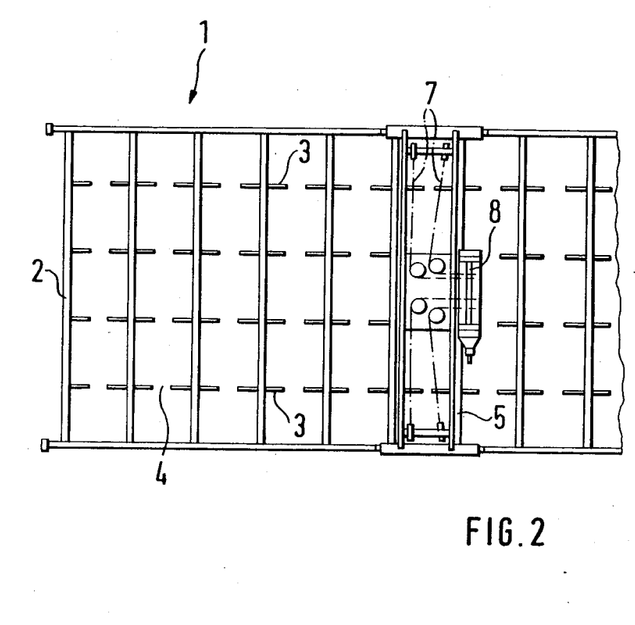
FIG. 2 is a top plan view of a detail of a stack arrangement having shelves and a crane.

FIGS. 1 and 2, in side view and plan view, show a detail of a storage system 1 for rod-like material, the system comprising stack frames, or stacks, 2 that are parallel to and in alignment with one another and are provided on both sides with shelf-like supporting arms 3; the arms 3 are secured to the stack frames as vertical stack supports and are arranged in rows one above the other, to form a tiered array. Gaps denoted as corridors 4 are left open between the individual stacks 2. A bridge crane 5 of a stack conveyor and material handler is movable above the stacks, and arranged to extend downwardly from the bridge crane 5 are vertical guides 6, along which a load-bearing beam (not visible in FIGS. 1 and 2) can be raised and lowered, for instance by means of cables 7 which engage the load-bearing beam, and which further originate in motor-driven cable drums 8.

Figure 3:
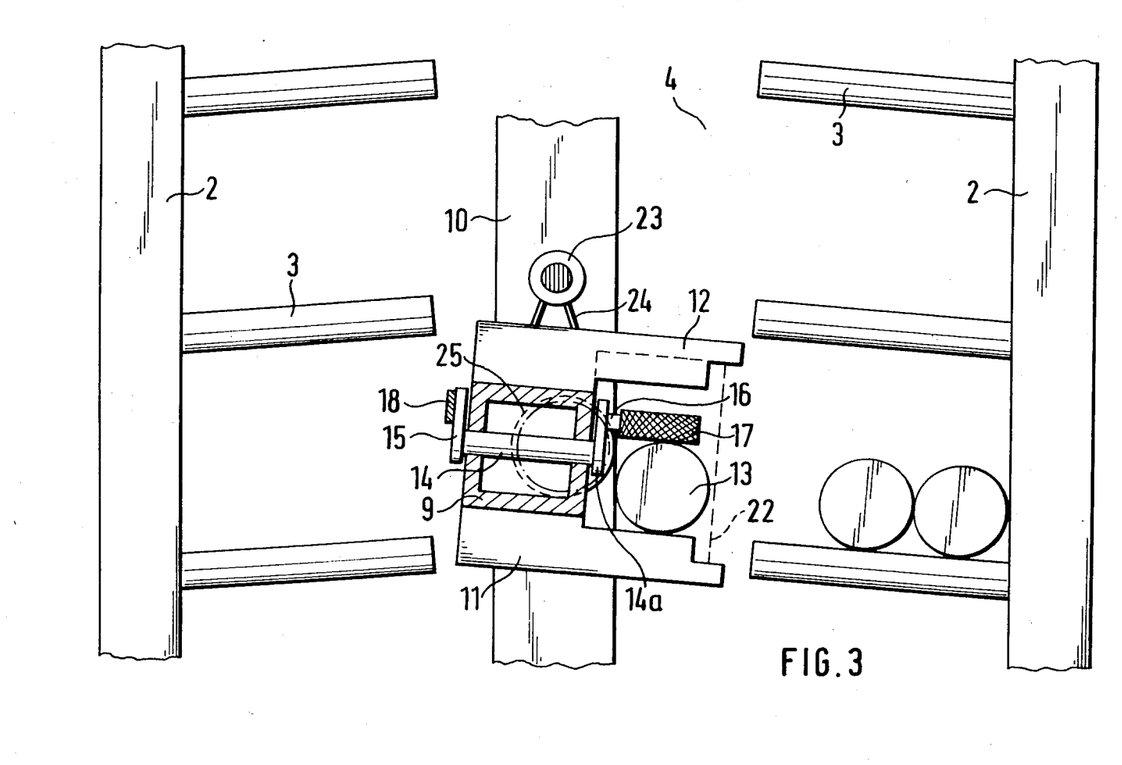
FIG. 3 is a side view of a portion of a corridor between adjacent stacks, showing an end view of a load-bearing beam, on a larger scale and partly cutaway.

As viewed in the direction of FIG. 1, FIG. 3 shows two stacks 2 with supporting arms 3; it should be understood that supporting arms 3 extend from the vertical stack supports on the other side as well, although this is not shown. Between the stacks 2, an unobstucted corridor 4 is again visible, and a load-bearing beam 9 is movable vertically in the corridor 4, via carriages 10 located on the end of the beam 9 on the vertical guides 6 of FIG. 1, which are not shown in FIG. 3.

Figure 4:
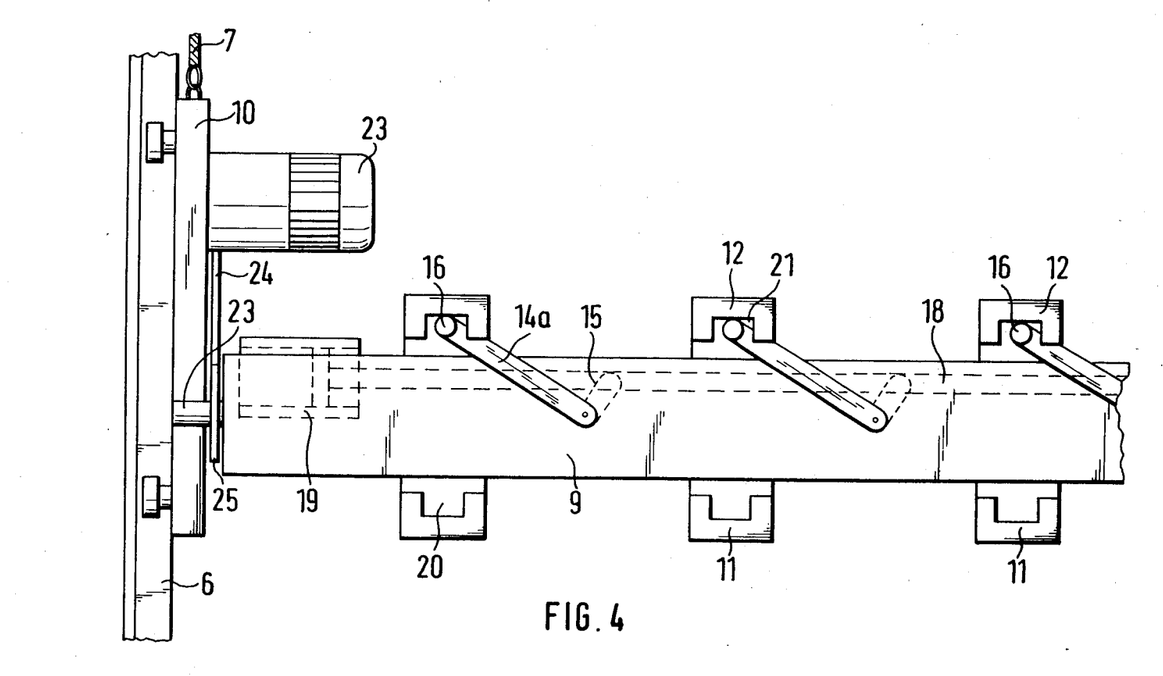
FIG. 4 shows the load-bearing beam of FIG. 3 in a side view, seen from the right as shown in FIG. 3.

As seen from FIG. 3 taken together with FIG. 4, the load-bearing beam 9 has firmly attached prongs 11 and 12 on both sides, which in the operating position shown extend substantially horizontally having a complemental dispositon to the slightly oblique position of the supporting arms 3. The prongs 11 and 12 are identically embodied, but are arranged rotated by 180° from one another. Between them, a spacing is left in the vertical direction, which corresponds to the maximum cross section of the workpiece material 13 that is expected to be handled.

Between the pairs of opposed prongs 11, 12, substantially horizontal shafts 14 are rotatably supported in the horizontal direction in the load-bearing beam 9, each shaft having on the respective ends a swivel arm 14a and a positioning arm 15, which are arranged at an angle from one another as shown in FIG. 4; this angle may be on the order of approximately 90°. Clamping mandrels 16 pointing in the direction of the facing stack are mounted on the swivel arms 14a; the longitudinal extent of the mandrels substantially corresponds to the free length of the prongs 11, 12. The clamping mandrels 16 may be provided with a covering 17 or the like to increase friction.

The positioning arms 15 are articulated on a rod 18 such that they are rotatable in common; the rod 18 extends in the direction of the load-bearing beam 9 and is displaceable by a cylinder-piston unit 19 mounted on the load-bearing beam 9, so as to move the clamping mandrels 15 substantially in the vertical direction. It is useful for a cylinder-piston unit 19 to be provided on the right-hand end of the rod 18 as well (not shown in FIG. 4), so that the rod 18 is suhjected to uniform positioning force over its entire length.

As shown particularly in FIG. 4, the prongs 11, 12 have recesses 20, 21, into which the clamping mandrels 16, 17 can withdraw completely in their end positions, so that the space available for the material 13 between the prongs 11, 12 is then free.

A gated light harrier 22 such as a photoelectric transmitter and a pickup is disposed on the free ends of the prongs 11, 12 in a manner not shown; by this means, when the load-bearing beam 9 moves in the horizontal direction the presence of material 13 can be detected, and the movement of the crane can be controlled accordingly.

FIG. 4 also shows one of the carriages 10, which have already been mentioned with respect to FIG. 3, as well as a vertical guide 6, mentioned in connection with FIG. 1 and on which the carriage 10 is vertically movable by the movement of the cable 7. A corresponding guide is also provided on the right-hand side, not shown in FIG. 4.

On this carriage 10, the load-bearing beam 9 is rotatably supported via pegs 23a located at the ends thereof and the rotational adjustment and positioning of the load-bearing beam 9 is effected by means of a rotation transducer 23, which is mounted on the carriage 10 and transmits its rotation to the load-bearing beam 9, for instance via a chain 24 and gear wheel 25.

As seen in FIG. 3, a rod 13 of material is pressed by the clamping mandrels 16 against the prongs 11, thus being clamped between these parts as if by tongs, and held so positively that it can be moved with a high conveying speed. If the bridge crane 5 is imagined as being rotated by somewhat more than 180° from what is shown in FIG. 3, then a rod of material can be gripped in the same manner between the prongs 12 and the clamping mandrels 16; the mandrels need only be moved toward the prongs 12, out of the opposite position with respect to FIG. 4. In other words, the clamping mandrels 16 can be used for clamping material against both the prongs 11 and the prongs 12. Only the cylinder-piston units 19 need to be moved in the reverse direction, out of their opposite end position.

It will readily be understood that with respect to FIG. 3, for instance, the prongs 11, 12 are disposed offset from the supporting arms 3, at right angles to the plane of the drawing, so that when the load-bearing beam 9 is moved vertically to pick up and set down material between the supporting arms 3, the prongs 11, 12 can be moved vertically without colliding with these arms 3.

Figure 5:
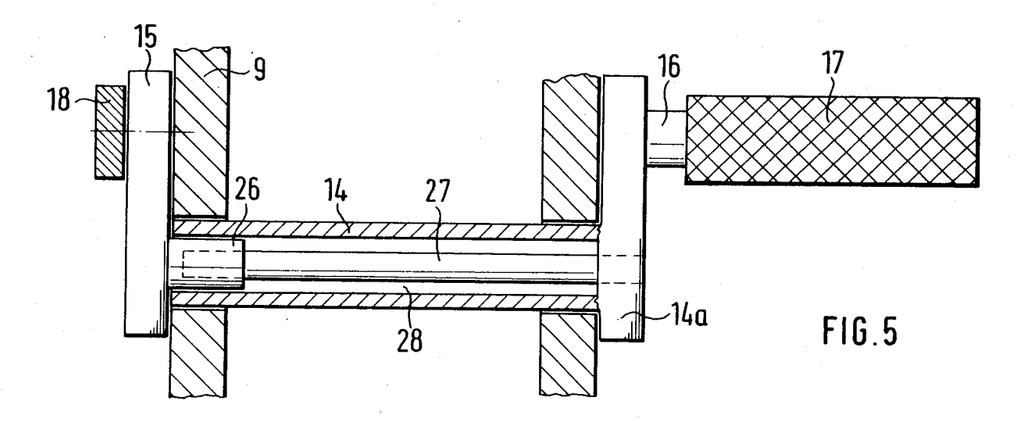
FIG. 5 shows a detailed sectional view of FIG. 3 on a larger scale.

FIG. 5 shows a detail of FIG. 3, on a larger scale. Here, the load-bearing beam 9, one of the shafts 14 with the swivel arm 14a and positioning arm 15 located on its ends, and a clamping mandrel 16 and rod 18 are partially visible. As also shown in FIG. 5, the positioning arm 15 is rotatably supported in the hollow shaft 14 by means of a peg 26, and the rotational connection between the positioning arm 15 and the swivel arm 14a is provided by means of a torsion spring bar 27, which extends through the hollow space 28 in the shaft 14. By means of the torque transmission provided by the torsion spring bar 27, it is assured that with rod-like material having a larger cross section, the clamping mandrels 16 will press against the material with a greater clamping force than against material having a smaller cross section. Assuming an equally large swiveling movement of the positioning arm 15, which is dependent on the tension on the material, the swivel arm 14a can do nothing else but execute a smaller swiveling movement with thicker material than with thinner rod material. Correspondingly, with thicker material the torsion spring bar 27 will be more highly pre-stressed than with thin rod-like material, which is associated with a correspondingly variable tension exerted by the clamping mandrel 16 upon the material.

Figure 6:
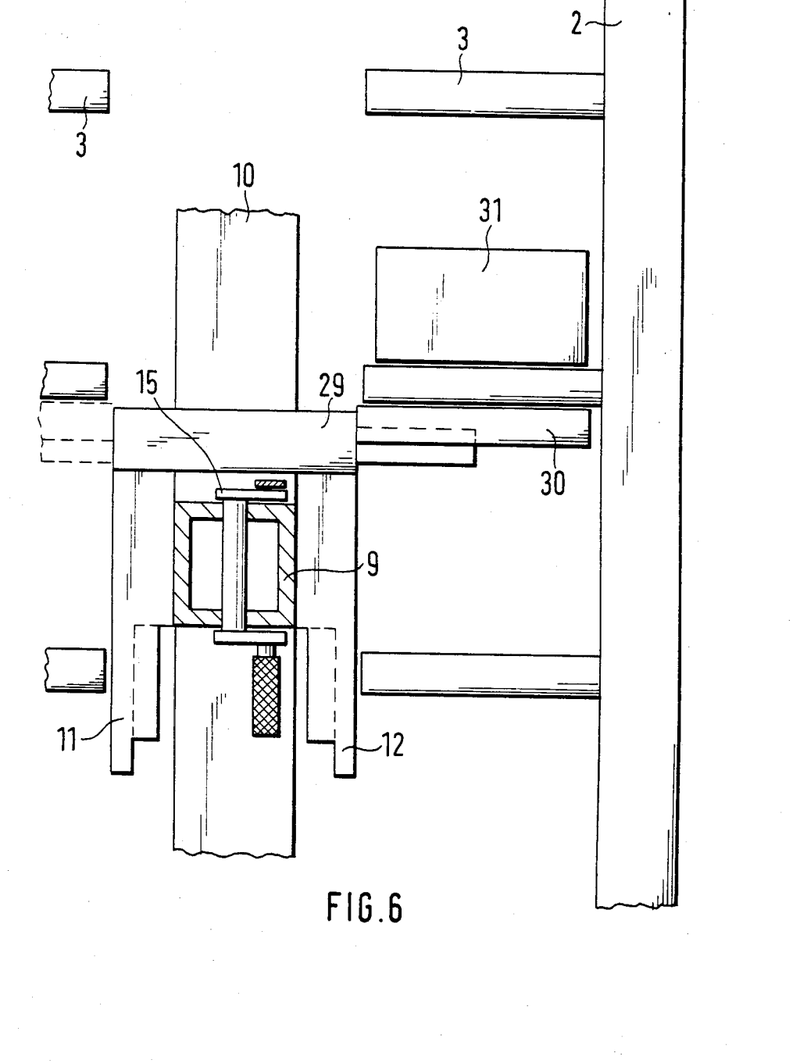

FIG. 6, in a view corresponding to FIG. 3, shows an expanded embodiment of the means for moving material that is attached to the load-bearing beam 9. The addition involves devices 29 having extendable telescoping forks 30 on both sides, which are mounted on the "back" of the load-bearing beam 9, or in other words on the side opposite the free end of the prongs 11, 12, where the positioning arms 15 are located, and they are arranged to extend from it laterally with respect to the extent of prongs 11, 12.

To use these devices 29 equipped with telescoping forks 30, the load-bearing beam 9 is swiveled into a third operating position, in which the prongs 11, 12 point vertically downward, so that the telescoping forks 30 move in the horizontal direction. In this way, with the aid of the telescoping forks 30, pallets 31 located in the stacks 2 on the supporting arms 3 can be picked up and moved. As compared with FIG. 3, the additional provision of the means 29 does mean a widening of the corridor between stacks; however, the additional expense involved is slight when compared with the increase in utility of the apparatus.

Figure 7:
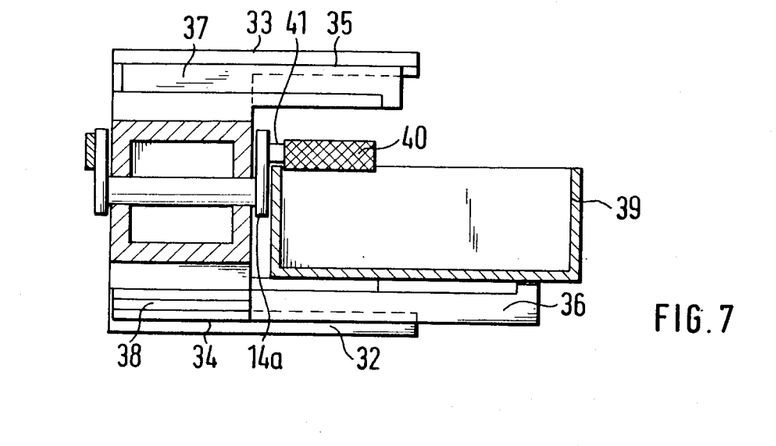
FIG. 7 shows a further variant of the invention in a detail view corresponding to FIG. 3.

FIG. 7, finally, shows the basic structure of a load-bearing beam in a view corresponding to FIG. 3. Here, however, prongs 32, 33 are provided, which have a guide 34, 35 or the like extending in the longitudinal direction. Extensions 36, 37 for the prongs are automatically displaceable in the guides 34, 35, for example via a cylinder-piston unit, of which the piston rod 38 is visible on the lower prong 32; the left-hand end of the piston rod 38 is secured to the prong 32, while the cylinder is disposed on the extension 36 in a manner not shown in detail.

In the manner shown, the extensions 36, 37 provide another opportunity for using the apparatus for handling pallets or cassettes 39, stored at appropriately arranged locations, as well. To do so, the extension 36 or 37 is extended, i.e., moved outward. To secure the picked-up cassettes 39 against slipping, the clamping mandrels 40 may have an annular groove 41 disposed adjacent to the swivel arms; this groove allows the mandrels to grip the edge of the cassette in a positive manner, the inner end of the mandrel serving as a retaining shoulder against the inside wall of the cassette.

The foregoing relates to a preferred embodiment of the invention, it being understood that other variants and embodiments thereof are possible within the spirit and scope of the invention, the latter being defined by the appended claims.

What is claimed and desired to be secured by Letters Patent of the United States is:

1. A stack conveyor and handler in the form of a crane, in particular for warehouse or storage system use, for rod-like material, having stack frames disposed crosswise to and aligned with one another in a longitudinal direction which are provided in a shelf-like manner with adjacent rows of supporting arms for the material, the rows being arranged one above the other extending in the longitudinal direction and are secured on vertical supports, wherein the crane, which is movable crosswise to the corridors between stacks, has vertical guides located outside the shelves for a horizontal load-bearing beam, said beam being parallel to the corridors between the stacks, which can be raised and lowered in between the shelves, said beam protruding horizontally between the rows of supporting arms having firmly attached thereto load pickup means in the form of prongs extending in the longitudinal direction, the prongs being insertable by the movement of the crane into the shelves so as to store material or remove from storage, in which the load pickup means includes at least one pair of opposing prongs (11 or 12; 32 or 33) connected to the load-bearing beam (9), the prongs in each pair being spaced apart by substantially the maximal cross section of the material; clamping mandrels (16, 40) in the region between opposing prongs, the clamping mandrels extend in the longitudinal direction and are movable substantially vertically and are fastenable against the prongs for clamping the material (13), the length of the mandrels being substantially equal to that of the prongs; a load-bearing beam is supported on a means (10) for movement on vertical guides (6) connected to the crane such that said load bearing beam is rotatable about a horizontal axis between at least two operating positions, wherein the prongs extend in the longitudinal direction and are also parallel to said corridors (4) between the stacks.

2. A stack conveyor and handler as defined by claim 1, in which said clamping mandrels (16, 40) are disposed on the free end of swivel arms (14a) rotatably supported on the load-bearing beam (9), and that the swivel arms are movable by a motive positioning means (18, 19) supported by the load-bearing beam.

3. A stack conveyor and handler as defined by claim 2, characterized in that said pivot bearing of said swivel arms (14a) is disposed between adjacent pairs of prongs (11, 12; 32, 33).

4. A stack conveyor and handler as defined by claim 2, characterized in that said swivel arms (14a) are each rotatably supported via a shaft (14), extending in the longitudinal direction, on said load-bearing beam (9).

5. A stack conveyor and handler as defined by claim 4, characterized in that said shafts (14) located on the side of the load-bearing beam (9) opposite the swivel arms (14a) support positioning arms (15), and that the positioning means (18, 19) engage the positioning arms.

6. A stack conveyor and handler as defined by claim 2, characterized in that the swivel arms (14a) are movable by a common positioning means (18).

7. A stack conveyor and handler as defined by claim 5, characterized in that the swivel arms (14a) or the positioning arms (15) are connected with one another by a rod (18) that is parallel to the load-bearing beam (9), and that the rod is articulated onto the positioning means (19).

8. A stack conveyor and handler as defined by claim 7, characterized in that positioning means (19) acting in the same direction are articulated onto both ends of the rod (18).

9. A stack conveyor and handler as defined by claim 5, characterized in that the positioning arms (15) are rotationally joined to the swivel arms (14a) via spring means (27).

10. A stack conveyor and handler as defined by claim 9, in which the spring means includes a torsion spring bar (27) disposed in a bore (28) of the shaft (14).

11. A stack conveyor and handler as defined by claim 1 characterized in that the clamping mandrels (16, 40), in the two extreme positions of their range of movement, are moved completely into recesses (20, 21) of the prongs (11, 12; 32, 33).

12. A stack conveyor and handler as defined by claim 1, characterized in that the load-bearing beam (9) is rotatable, and retainable in its operating positions, by motive means disposed on the crane.

13. A stack conveyor and handler as defined by claim 12, in which the motive means include a servomotor (23) disposed on the beam supporting means (10), and a drive connection (24, 25) for rotating the beam.

14. A stack conveyor and handler as defined by claim 12, characterized in that said motive means (23-25) for rotating the beam (9) are disposed on both ends of the beam.

15. A stack conveyor and handler as defined by claim 12, characterized in that said motive means for rotating the beam simultaneously act as rotation transducers (23) for positioning the beam in its operating positions.

16. A stack conveyor and handler as defined by claim 1 characterized in that said prongs (32, 33) carry extendable and retractable extensions (36, 37) via guides (34, 35) extending in the longitudianal direction of the prongs.

17. A stack conveyor and handler as defined by claim 1 characterized in that said clamping mandrels (40) have a cross-sectional reduction (41) adjacent the swivel arms (14a).

18. A stack conveyor and handler as defined by claim 1, characterized in that said prongs (11, 12; 32, 33), at the two operating positions of the load-bearing beam (9), are positioned parallel to the supporting arms (3) of the shelf where handling is to be done.

19. A stack conveyor and handler as defined by claim 1, characterized in that said load-bearing beam (9) is rotatable into and positionable in a third operating position, in which said prongs (11, 12; 32, 33) extend vertically downward, and that on the side of the load-bearing beam remote from the prongs further load pickup means (29), in the form of telescoping forks (30), are movable in and out on both sides in the longitudinal direction, and disposed between the rows of supporting arms.

20. A stack conveyor and handler as defined by claim 1, characterized in that a light control means is disposed between the free ends of the pairs of associated prongs (11, 12; 32, 33).

* * * * *